G. DARROCH.
HYDRAULIC STEERING SYSTEM.
APPLICATION FILED MAR. 28, 1921.
1,426,822.
Patented Aug. 22, 1922.
5 SHEETS—SHEET 4.
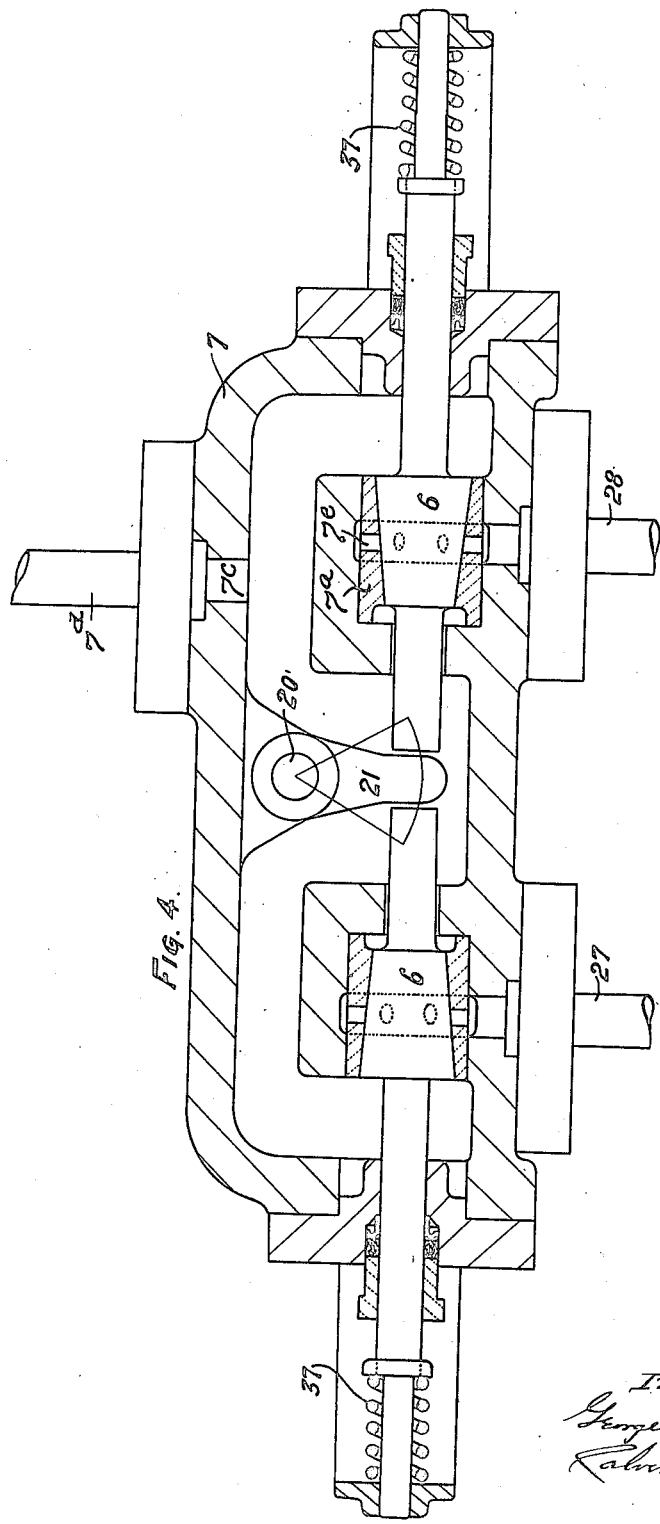

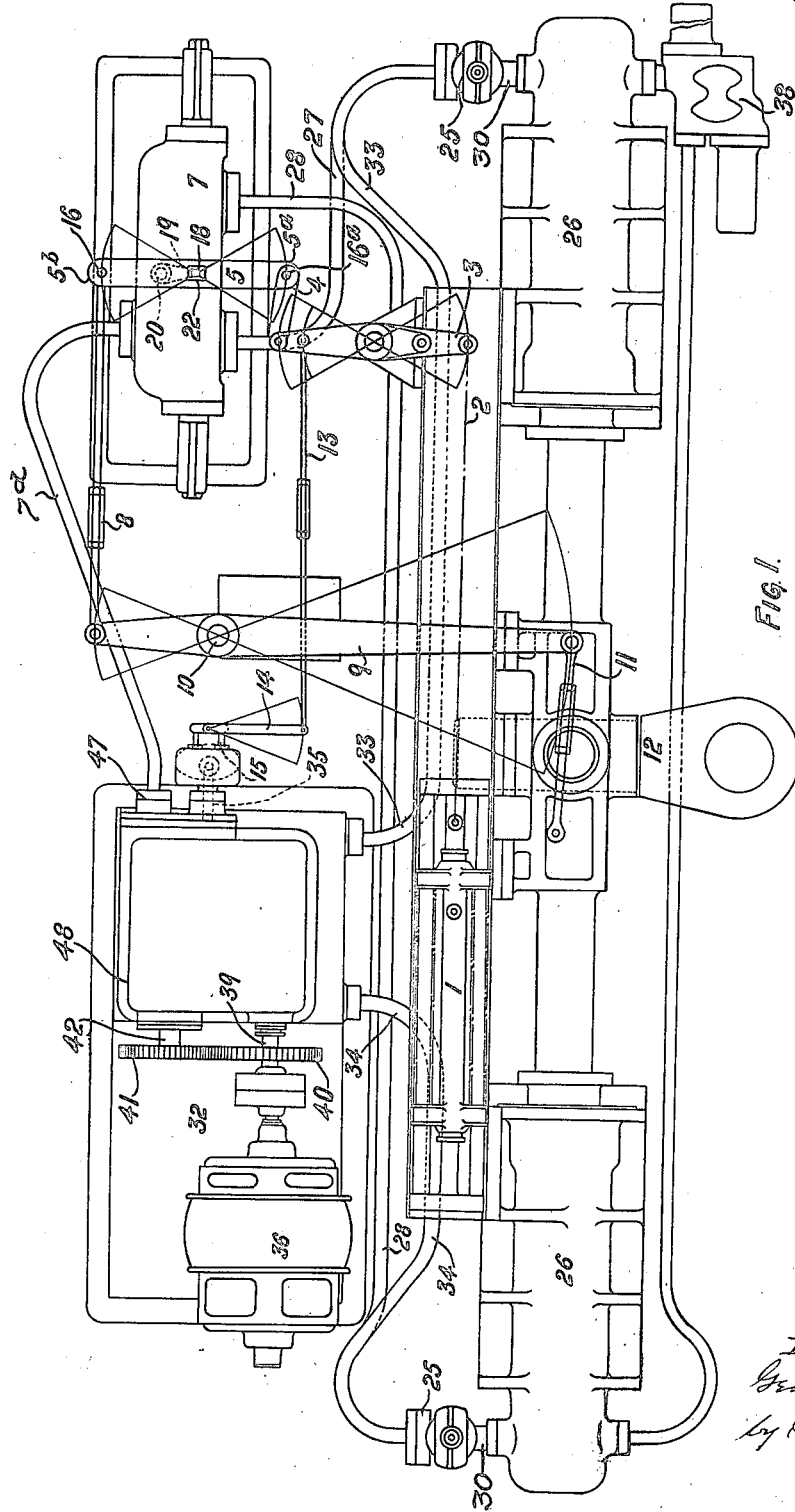

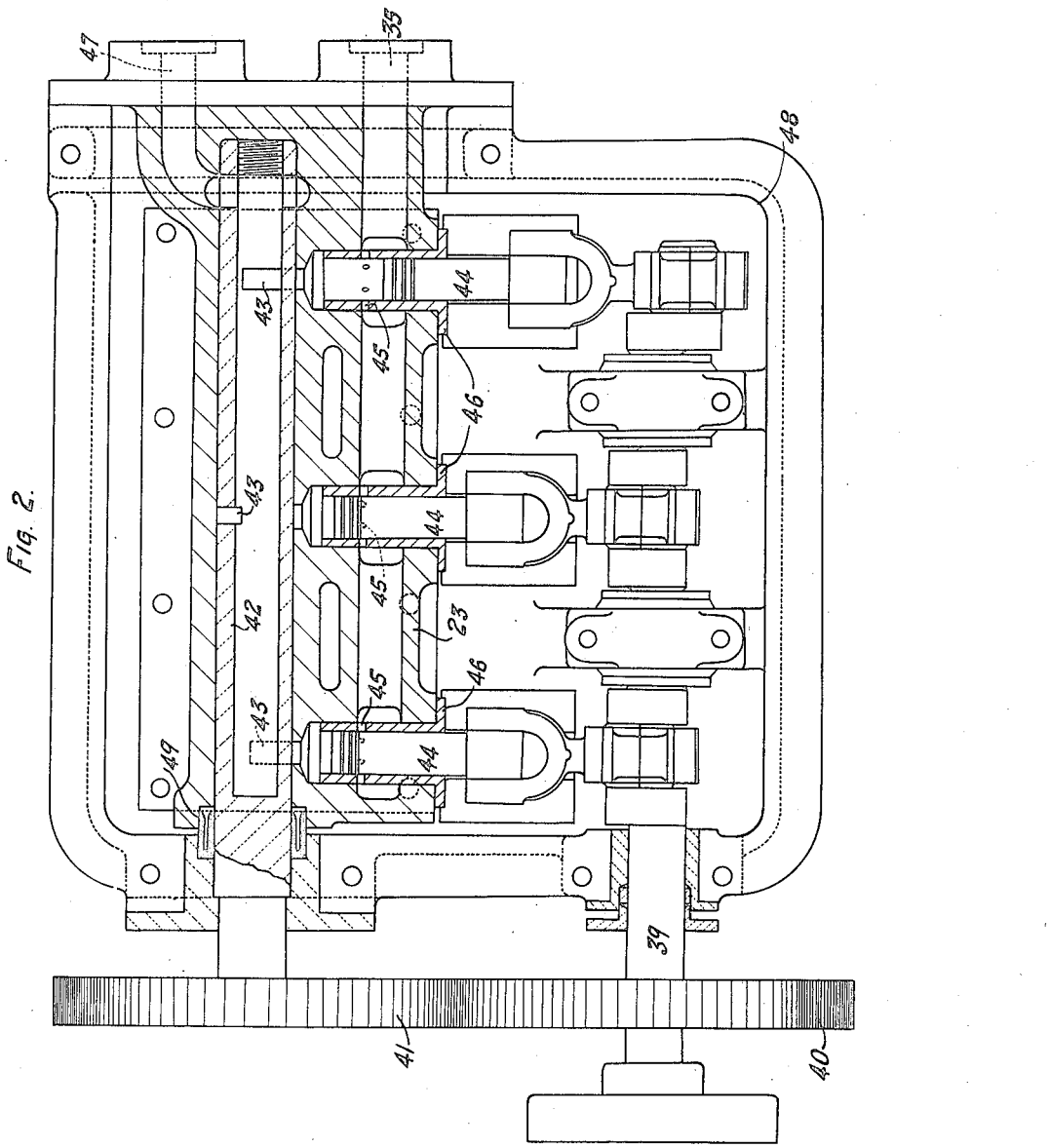

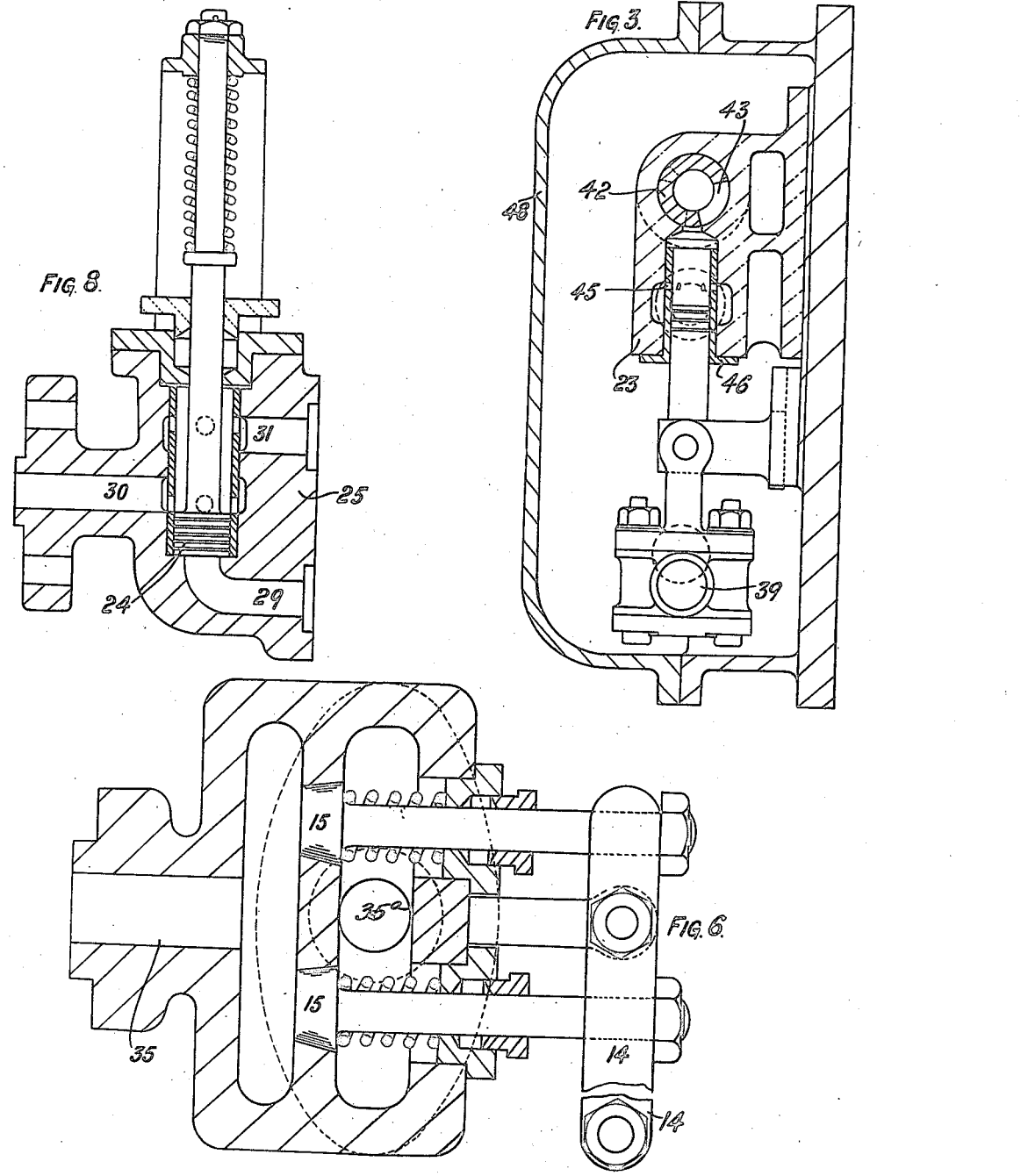

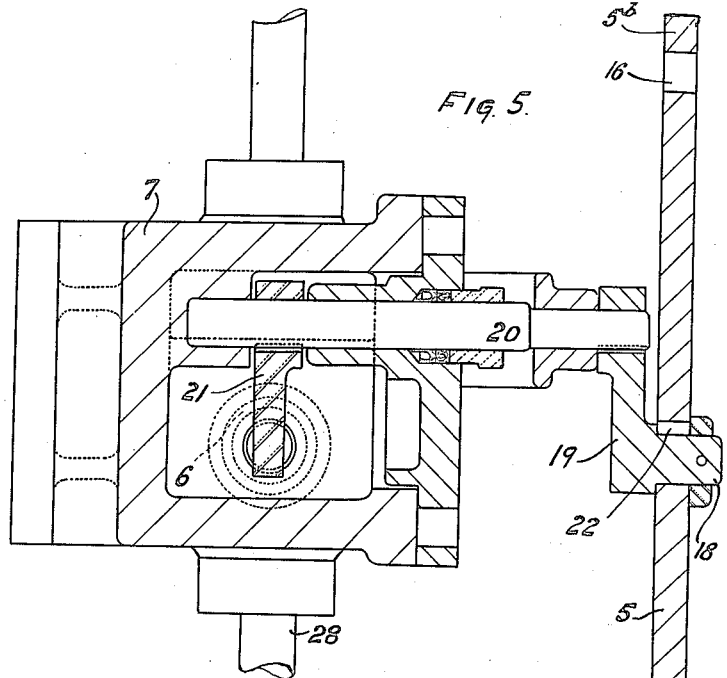
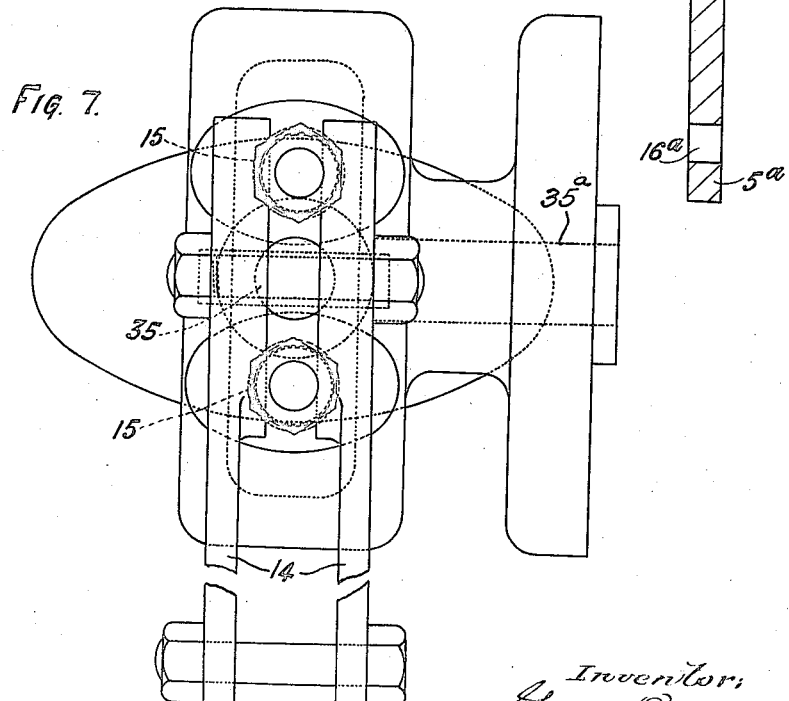

UNITED STATES PATENT OFFICE.

GEORGE DARROCH, OF GREENOCK, SCOTLAND.

HYDRAULIC STEERING SYSTEM.

1,426,822. Specification of Letters Patent. Patented Aug. 22, 1922.

Application filed March 28, 1921. Serial No. 456,180.

*To all whom it may concern:*

Be it known that I, GEORGE DARROCH, a subject of the King of the United Kingdom of Great Britain and Ireland, and residing at Greenock, Renfrewshire, Scotland, have invented a certain new and useful Improvement in Hydraulic Steering Systems, of which the following is a specification.

This invention relates to a system of steering vessels by means of force pumps such as ram pumps or centrifugal pumps the flow of liquid to and from which is controlled by valves.

The steering as heretofore, is mainly effected by hydraulic rams operating in cylinders, the discharged liquid from the pumps acting in opposite directions on a tiller keyed to the rudderhead of the vessel, the rams and cylinders being hereinafter referred to as steering rams and steering cylinders.

A continuously running electric motor or a suitable prime mover is coupled to a pump which is connected to either steering cylinder as required for the steering of the vessel.

In the drawings Fig. 1 is a plan, Fig. 2 a detail part plan part section of the pump, Fig. 3 a section at right angles to Fig. 2, Fig. 4 a section of control valves and chest, Fig. 5 a section at right angles to Fig. 4, Fig. 6 a section of the shut-off valves and the chest for the pump, Fig. 7 a view at right angles to Fig. 6, and Fig. 8 a section of the suction shut-off valve for the steering cylinders.

Referring to the drawings, 1 denotes a telemotor of known construction which is actuated by the steersman. The telemotor 1 is connected by means of links 2, a double ended lever 3 and links 4 to one end $5^a$ of a floating lever 5 which operates controlling valves 6 in a valve chest 7 (see Fig. 4). The valve chest 7 is formed with conical seatings $7^a$ accommodating the valve elements 6 which are urged towards closed position by springs 37. The chest 7 is formed with an inlet port $7^c$ connected by pipe $7^d$ to a common discharge passage 47 hereinafter referred to. The seatings are formed with ports $7^e$ communicating with pipes 27, 28 hereinafter referred to. The end $5^b$ of the floating lever 5 is connected by means of links 8 to a double-ended lever 9 which is fulcrumed at 10. A link 11 connects the lever 9 to the tiller 12. The double-ended lever 3 is also connected by means of link 13 and a lever 14 to the pump suction shut-off valves 15. When the telemotor is moved in either direction, the end $5^a$ of the floating lever 5 moves correspondingly on a fulcrum pin 16 whereby is shifted a pin 18, fixed on the end of a lever 19 coupled by means of a spindle 20 to a lever 21 which operates the controlling valves 6. The pin 18 moves in a slot 22 in the center of the floating lever 5 and any movement of the lever 5 causes either one or other of the controlling valves 6 to be opened whereby is established a clear passage between a pump 23 and the bottom of a plunger 24 in the shut-off valve 25 fixed to one of the steering cylinders 26. In the valve 25 a pipe as 27 or 28 leads to a port 29 and a pipe as 33 or 34 leads from a port 31 to the replenishing tank 32. The pressure fluid raises the plunger 24 whereby is established a clear passage between the pump 23 and one or other of the steering cylinders 26 by way of the pipes 27, 28 and the passages or ports 29 and 30 and there is closed the suction or drain passage or port 31 from the operating cylinder 26 to the replenishing tank 32. Connection between the passages 31 and tank 32 is made by way of pipes 33 and pipes 34. The inoperative steering cylinder meanwhile is open to the replenishing tank. The same movement of the telemotor 1 causes one of the pump suction shut-off valves 15 to open and to establish a clear passage between the common suction passage 35, leading to the pump 23, and the passage $35^a$ leading to the replenishing tank 32. The pump 23 being driven preferably by a continuously running motor 36, immediately sucks from the replenishing tank, and discharges to one of the steering cylinders 26. The tiller 12 moves in the requisite direction and its movement is transmitted to the end $5^b$ of the lever 5 and, the lever 5 fulcruming round the pin $16^a$ in the end $5^a$ causes the lever 21 to move to its mid position, and the controlling valve previously opened is immediately closed by one of the springs 37. This operation is repeated until the desired angle of rudder is obtained.

In accordance with existing practice, there is fitted a shock and by-pass valve 38 between the cylinders 26 so that any excess pressure in one cylinder is released to the opposite cylinder.

On the pump crank shaft 39 is keyed a gear wheel 40 which meshes with a gear wheel 41 on an extension of a tube 42, which forms the receiver for the pump discharge.

On the walls of the tube 42 are cut ports 43 in suitable positions to take the discharge from either of the rams 44 as the tube is rotated and also the ports 43 are arranged so that communication is cut off between the tube 42 and the pump cylinders 46 when the respective plunger is on the suction stroke.

To eliminate end thrust on the pump casing both ends of the tube 42 are closed.

The rams 44 operate in hardened cylinders 46 fitted within the chest having a common suction passage 35 and a common discharge passage 47. On the walls of each cylinder are cut ports 45 the position of which is arranged so that the cylinders in sequence communicate with the suction passage 35.

The pump is enclosed in an oil tight case 48.

A cup leather 49 is fitted at one end of the discharge tube to prevent leakage to the oil tight case.

I claim:—

1. In a hydraulic steering system, in combination, steering cylinders, steering rams in said cylinders, a pump for supplying fluid to said steering cylinders, said pump comprising a driven shaft, crank devices on said shaft, multiple rams operatively connected to said cranks, cylinders in which said multiple rams are reciprocable, a chest associated with said second mentioned cylinders said chest having a suction passage and a discharge passage common to all said second mentioned cylinders, said chest also formed with relatively small suction holes leading into said suction passage and so arranged as to be uncovered sufficiently for effective replenishment of said second mentioned cylinders before commencement of the discharge portion of the stroke, a revoluble tube located at the discharge end of said second mentioned cylinders and operatively connected to said driven shaft, said tube being provided with discharge ports leading to said common discharge passage so arranged that the discharge of said second mentioned cylinders occurs in sequence and that each of said second mentioned cylinders is cut off from said discharge passage during the suction stroke of said pump, controlling valves under control of the steersman for selecting the steering cylinders to which fluid is to be delivered, and a branch communicating with said tube and with said controlling valves.

2. In a hydraulic steering system, in combination, steering cylinders, steering rams in said cylinders, a pump for supplying fluid to said steering cylinders, said pump comprising a driven shaft, crank devices on said shaft, multiple rams operatively connected to said cranks, cylinders in which said multiple rams are reciprocable, a chest associated with said second mentioned cylinders said chest having a suction passage and a discharge passage common to all said second mentioned cylinders, said chest also formed with relatively small suction holes leading into said suction passage and so arranged as to be uncovered sufficiently for effective replenishment of said second mentioned cylinders before commencement of the discharge portion of the stroke, a revoluble tube located at the discharge end of said second mentioned cylinders and operatively connected to said driven shaft, said tube being provided with discharge ports leading to said common discharge passage so arranged that the discharge of said second mentioned cylinders occurs in sequence and that each of said second mentioned cylinders is cut off from said discharge passage during the suction stroke of said pump, controlling valves under control of the steersman for selecting the steering cylinders to which fluid is to be delivered, a branch communicating with said tube and with said controlling valves, a twin shut-off valve to regulate the flow into said suction passage, said twin suction valve including valve elements, spring means urging said elements towards seating position, spindles for said valve elements, a valve chest penetrated by said spindles, a fulcrum pillar located between said valve elements and a lever carried by said fulcrum pillar and serving, when moved in either direction, to unseat one or other of said valve elements, and, when held stationary in an intermediate position to permit said elements to become seated whereby to arrest the supply of fluid to said pump.

3. In a hydraulic steering system, in combination, steering cylinders, steering rams in said cylinders, a pump for supplying fluid to said steering cylinders, said pump comprising a driven shaft, crank devices on said shaft, multiple rams operatively connected to said cranks, cylinders in which said multiple rams are reciprocable, a chest associated with said second mentioned cylinders, said chest having a suction passage and a discharge passage common to all said second mentioned cylinders, said chest also formed with relatively small suction holes leading into said suction passage so arranged as to be uncovered sufficiently for effective replenishment of said second mentioned cylinders before commencement of the discharge portion of the stroke, a revoluble tube located at the discharge end of said second mentioned cylinders and operatively connected to said driven shaft, said tube being provided with discharge ports leading to said common discharge passage so arranged that the discharge of said second mentioned cylinders occurs in sequence and that each of said second mentioned cylinders is cut off from said discharge passage during the suction stroke of said pump, controlling valves under control of the steersman for selecting the steering cylinders to which fluid is to be delivered, said controlling valves comprising a chest provided with an inlet branch for the pump delivery, a separate outlet branch for discharge to each of said steering cylinders, valve seatings formed in said chest and each formed with ports communicating with a relative steering cylinder, spring-urged co-axial valve elements operable in said seatings, a valve-operating lever interposed between said valve elements, a lever located external to the chest and connected to said valve-operating lever, a floating lever operatively connected to said external lever, a telemotor and a tiller, the telemotor connected to one end of said floating lever and the tiller connected to the other end of said floating lever whereby, when the telemotor acts in either direction on one end of the floating lever, one of said valve elements is unseated and communication is established between the pump and one of the steering cylinders to constrain the tiller to move, the tiller transmitting its movement to the opposite end of the floating lever whereby to restore the floating lever to initial position and to seat both controlling valves.

4. In a hydraulic steering system, in combination, steering cylinders, steering rams in said cylinders, a replenishing tank, a pump for supplying fluid to said steering cylinders, said pump comprising a driven shaft, crank devices on said shaft, multiple rams operatively connected to said cranks, cylinders in which said multiple rams are reciprocable, a chest associated with said second mentioned cylinders, said chest having a suction passage and a discharge passage common to all said second mentioned cylinders, said chest also formed with relatively small suction holes leading into said suction passage so arrange as to be uncovered sufficiently for effective replenishment of said second mentioned cylinders before commencement of the discharge portion of the stroke, a revoluble tube located at the discharge end of said second mentioned cylinders and operatively connected to said driven shaft, said tube being provided with discharge ports leading to said common discharge passage so arranged that the discharge of said second mentioned cylinders occurs in sequence and that each of said second mentioned cylinders is cut off from said discharge passage during the suction stroke of said pump, controlling valves under control of the steersman for selecting the steering cylinders to which fluid is to be delivered, a branch communicating with said tube and with said controlling valves, and shut-off valves one connected to each of said steering cylinders, each shut-off valve comprising a valve chest provided with three passageways leading respectively to said controlling valve, to one of said steering cylinders and to said replenishing tank, a cylinder in said chest, a valve element operating in said last mentioned cylinder, and a spring load on said valve element of such effect that, when the steering cylinder connected therewith is not under pressure, a clear passage is afforded between said steering cylinder and the replenishing tank.

In testimony whereof I have signed my name to this specification in the presence of two subscribing witnesses.

GEORGE DARROCH.

Witnesses:
  KATE YOTHERINGHAM,
  ISABEL ROLLO.